(12) United States Patent  
Sato

(10) Patent No.: US 7,322,509 B2
(45) Date of Patent: Jan. 29, 2008

(54) FRICTION STIR SPOT JOINING DEVICE

(75) Inventor: Yoshio Sato, Ayase (JP)

(73) Assignee: Obara Corporation, Ayase-shi, Kanagawa-ken (JP)

( * ) Notice: Subject to any disclaimer, the term of this patent is extended or adjusted under 35 U.S.C. 154(b) by 572 days.

(21) Appl. No.: 11/037,809

(22) Filed: Jan. 18, 2005

(65) Prior Publication Data

US 2005/0189398 A1 Sep. 1, 2005

(30) Foreign Application Priority Data

Jan. 26, 2004 (JP) .............................. 2004-016909

(51) Int. Cl.
B23K 20/12 (2006.01)

(52) U.S. Cl. ................... 228/2.1; 228/112.1; 156/73.5; 156/580; 74/89.34

(58) Field of Classification Search ................. 228/2.1, 228/112.1; 156/73.5; 76/5.1; 74/89.34
See application file for complete search history.

(56) References Cited

U.S. PATENT DOCUMENTS 5,549,015 A * 8/1996 Aiso et al. ................. 74/89.34

2002/0158109 A1 10/2002 Gendoh et al.
2003/0029903 A1* 2/2003 Kashiki et al. .......... 228/112.1

FOREIGN PATENT DOCUMENTS

JP 2002-126884 5/2002
JP 2002-273578 9/2002

* cited by examiner

Primary Examiner—Samchuan C. Yao
Assistant Examiner—Erin P Barry
(74) Attorney, Agent, or Firm—Flynn, Thiel, Boutell & Tanis, P.C.

(57) ABSTRACT

There is provided a friction stir spot joining device to eliminate the generation of tipping torque caused by a pressing force by allowing the axis of a ball screw for generating the pressing force and the center of a shaft of a stirring motor to be coincident with each other, thereby allowing the device to be downsized and the device to effect joining operation with ease. The friction stir spot joining device comprises a ball nut fixed to the rear end side the stirring motor, a hole is defined in an output shaft of the stirring motor in which the ball screw is housed from a rear portion of the hole so as to be positioned in the hole, wherein a rotating force of the pressing motor is transmitted to the ball screw and the stirring motor is moved forward and backward by the ball nut threaded with the ball screw.

8 Claims, 5 Drawing Sheets

000# FRICTION STIR SPOT JOINING DEVICE

FIELD OF THE INVENTION

The invention relates to a friction stir spot joining device for softening and stirring works to be joined due to friction heat generated by rotation of a pin so as to joint the works to be jointed together and provided with a pressing motor and a stirring motor fixed to one end side of an arm, a jointing tool having the pin at a tip end thereof and connected to an output shaft side of the stirring motor at a rear end thereof, wherein the stirring motor and the jointing tool are disposed on the same axis line.

BACKGROUND OF THE INVENTION

There has been conventionally a friction stir spot joining device for softening and stirring works to be joined due to friction heat generated by rotation of a pin so as to joint the works to be jointed together and provided with a pressing motor and a stirring motor fixed to one end side of an arm, a jointing tool having the pin at a tip end thereof and connected to an output shaft side of the stirring motor at a rear end thereof, wherein the stirring motor and the jointing tool are disposed on the same axis line (for example, as disclosed in JP-A 2002-126884).

However, in the prior art device, an axis of a ball screw for generating pressing force, the center of a directly moving guide (center of an elevating mechanism in the embodiment), and the center of a shaft of the stirring motor are largely eccentric from each other, an intermittent torque caused by a stirring force which accords with a rotating frequency of the stirring motor is applied to a guide portion of a pressing device to generate vibration, thereby shortening lifecycle of a guide of a directly moving ball of the pressing device, so that the size of the directly moving guide portion has to be made large, leading to an increase of cost. Further, there is a high possibility that the guide portion of the pressing device interferes with a narrow portion surrounded by the works to be joined and a jig, causing the joining device difficult to move to the narrow spot. Still further, since the pressure application center of a pressing force and a rotating center of a stirring shaft of the stirring motor are eccentric from each other, a tipping torque is generated at the pressure application center of the pressing force when the stirring motor is moved to press toward the works to be joined, thereby applying an excessive load to the guide.

SUMMARY OF THE INVENTION

The present invention has been made in view of the problems of the prior art device, and it is an object of the present invention to provide a friction stir spot joining device to eliminate the generation of tipping torque caused by a pressing force by allowing the axis of the ball screw and the center of the stirring motor shaft to be coincident with each other, thereby allowing the device to be downsized and the device to effect joining operation with ease.

To achieve the above object, in the friction stir spot joining device of the invention for softening and stirring works to be joined due to friction heat generated by rotation of a pin so as to join the works to be joined together and provided with a pressing motor and a stirring motor fixed to one end side of an arm, a jointing tool having the pin at a tip end thereof and connected to an output shaft side of the stirring motor at a rear end thereof, wherein the stirring motor and the jointing tool are disposed on the same axis line, it is characterized in further including a ball nut fixed to the rear end side of the stirring motor, wherein the output shaft of the stirring motor has a hole in which a ball screw is housed from a rear portion of the hole so as to be positioned in the hole, and wherein a rotating force of the pressing motor is transmitted to the ball screw and the stirring motor is moved forward and backward by the ball nut threaded with the ball screw.

The friction stir spot joining device is also characterized in that the pressing motor and the stirring motor are connected in series with each other.

According to the friction stir spot joining device of the invention, the ball screw for generating the pressing force is disposed at the rear end side of the stirring motor and the rotating force of the pressing motor is transmitted to the ball screw so that the stirring motor is moved forward and backward by the ball nut threaded with the ball screw, thereby forming the friction stir spot joining device capable of allowing the pressure application center of the pressing force and the rotating center of the stirring shaft of the stirring motor to be coincident with each other to eliminate the generation of the tipping torque, and capable of being used with more safety and ease by preventing the pressing device from interfering with the portion surrounded by works to be joined and the jig.

Further, in the case where a reduction gear is intervened between the output shaft of the stirring motor and the jointing tool, after the number of revolution (hereinafter referred to as rpm) of the stirring motor is increased more than necessary rpm, the rpm of the jointing tool is reduced to a predetermined rpm, so that the torque is increased to a desired value, thereby enhancing the downsizing of the motor. As a result, it is possible to obtain the friction stir spot joining device which is usable with more safety without causing interference of the pressing device with the portion surrounded by the works to be joined and the jig.

The friction stir spot joining device is structured such that it is provided with a pressing motor and a stirring motor fixed to one end side of an arm, a jointing tool having a pin at a tip end thereof and connected to an output shaft side of the stirring motor at a rear end thereof, wherein the stirring motor and the jointing tool are disposed on the same axis line, and the friction stir spot joining device further includes a ball nut fixed to the rear end side of the stirring motor, wherein the output shaft of the stirring motor has a hole in which a ball screw is housed from a rear portion of the hole so as to be positioned in the hole, and wherein a rotating force of the pressing motor is transmitted to the ball screw and the stirring motor is moved forward and backward by the ball nut threaded with the ball screw.

There is a case where a reduction gear is intervened between the output shaft of the stirring motor and the jointing tool.

PREFERRED EMBODIMENT OF THE INVENTION

Figure 1:
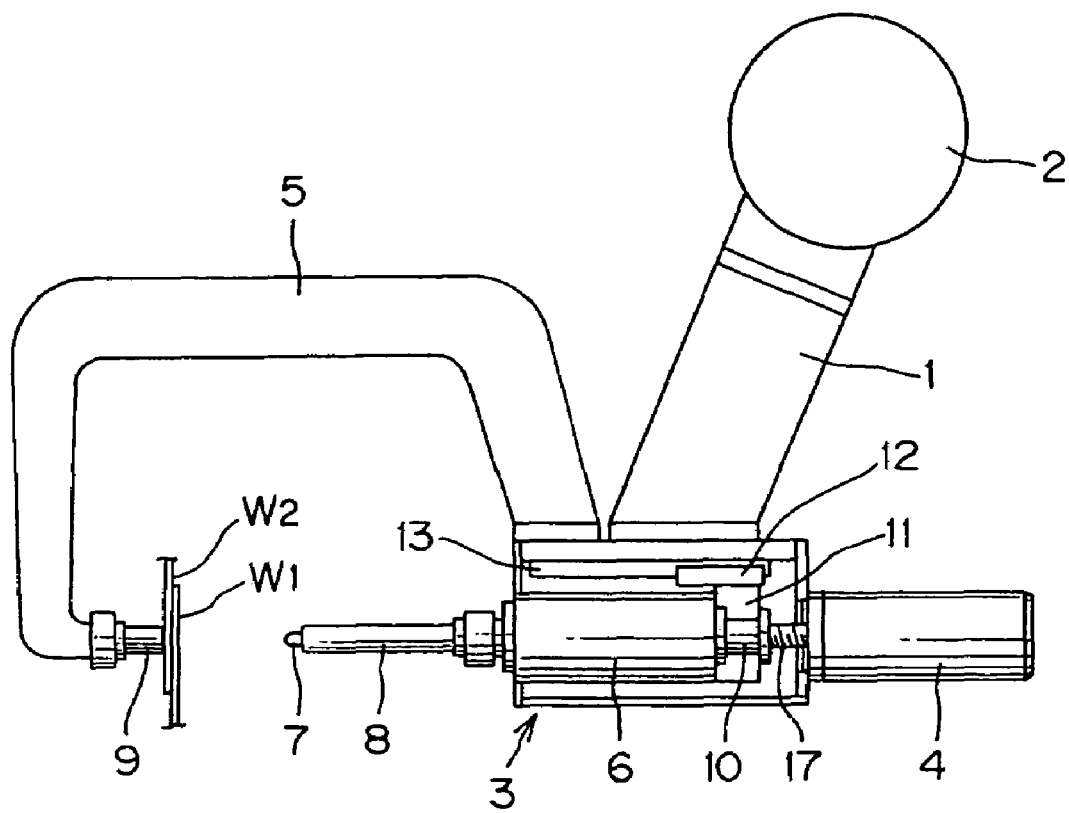
FIG. 1 is a view showing a schematic configuration of a friction stir spot joining device according to a first embodiment of the invention.
Figure 2:
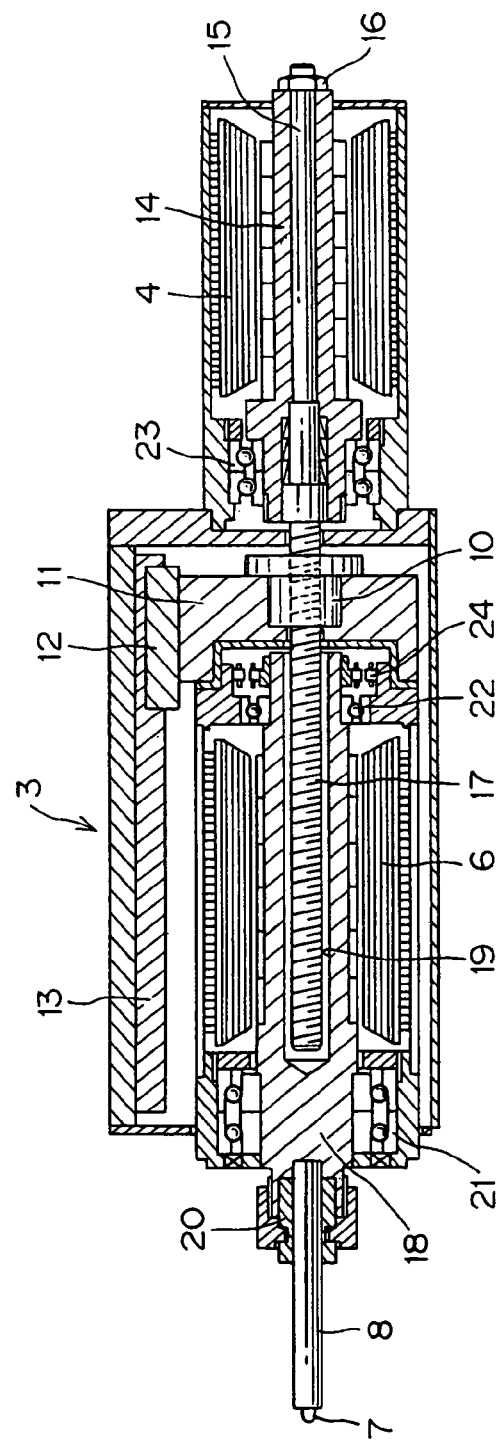
FIG. 2 is a schematic cross sectional view showing the relation of connection between a jointing tool, a stirring motor and a pressing motor according to the first embodiment of the invention.

First Embodiment (FIGS. 1 and 2)

FIG. 1 is a view showing a schematic configuration of a friction stir spot joining device according to a first embodiment of the invention, and FIG. 2 is a schematic cross sectional view showing the relation of connection between a jointing tool, a stirring motor and a pressing motor according to the first embodiment of the invention.

In FIG. 1, depicted by 1 is a bracket connected to a wrist 2 of a robot, and the bracket 1 has a power transmission box 3 at the base portion thereof, and a pressing motor 4 is disposed at one side of the power transmission box 3 while a fixed arm 5 is extended from the other side of the power transmission box 3.

A stirring motor 6 is disposed inside the power transmission box 3 and a jointing tool 8 having a pin 7 at the tip end thereof is connected to the stirring motor 6.

A backing material 9 is attached to a tip end of the fixed arm 5 while confronting with the pin 7, and works W1, W2 to be joined are disposed on the backing material 9.

Depicted by 10 is a ball nut fixed to the rear end side of the stirring motor 6, and there is provided an LM guide 12 at one side of the bracket 11 for holding the ball nut 10. Further, there is provided a guide rail 13 inside the power transmission box 3 along the direction of an axis line of the stirring motor 6 in the very close vicinity of the stirring motor 6. The LM guide 12 is movable along the guide rail 13 and the bracket 11 of the LM guide 12 is fixed to the rear end side of the stirring motor 6.

In FIG. 2, a ball screw shat 15 is fixed to a rotating shaft 14 of the pressing motor 4 by a nut 16. A ball screw 17 is formed at a tip end side of the ball screw shaft 15 and the ball screw 17 is guided from the pressing motor 4 toward the inside of the power transmission box 3, and is extended toward the inside of a hole 19 defined in the output shaft 18 from the rear portion of the output shaft 18, and the ball screw 17 is threaded with the ball nut 10 fixed to the rear end side of the stirring motor 6 in the middle of extension thereof.

The jointing tool 8 is clamped by a chuck 20 at the tip end side of the output shaft 18 of the stirring motor 6 and connected to the tip end side of the output shaft 18.

Depicted by 21 is an angular bearing for receiving a reaction force generated when a part of the works W1, W2 to be joined is pressed and stirred by the pin 7, 22 is a bearing of the output shaft 18 of the stirring motor 6, and 23 is a bearing of a rotating shaft of the pressing motor 4. Depicted by 24 is a sensor for detecting rpm of the stirring motor 6 and it is dispensed with when the stirring motor 6 is formed of an inverter motor.

With the configuration set forth above, in the friction stir spot joining device of the invention, the joining gun is approached to the works W1, W2 to be joined by a robot and the pressing motor 4 and the stirring motor 6 are driven in a state where the backing material 9 provided at the tip end of the fixed arm 5 is brought into contact with the works W1, W2 to be joined.

In the case where the ball screw shat 15 is rotated when the pressing motor 4 is driven so as to rotate the ball screw 17, the ball nut 10 screwed with the ball screw 17 is liable to move forward and backward. When the ball nut 10 is moved forward and backward, the stirring motor 6 is linearly moved forward and backward by the LM guide 12 fixed to the stirring motor 6, and further since the stirring motor 6 is provided with the jointing tool 8 having the pin 7 at the tip end thereof, it serves as a pressure application rod so as to change the amount of movement of the jointing tool 8 from and toward the power transmission box 3 because it is connected to the jointing tool 8.

Further, since the stirring motor 6 which is driven together with the pressing motor 4 is provided with the jointing tool 8 having the pin 7 at the at the tip end side thereof, the jointing tool 8 is rotated on the same axis line as the stirring motor 6 so that the pin 7 effects friction and stirring operation relative to the works W1, W2 to be joined.

With the configuration of the friction stir spot joining device of the invention, since the ball screw 17 is extended inside the hole 19 defined in the output shaft 18 of the stirring motor 6, the axis of the ball screw 17 for generating the pressing force and the center of the shaft of the stirring motor 6 is coincident with each other, thereby preventing generation of the tipping torque caused by the pressing force. Further, the device for generating the pressing force is housed in compact to downsize the entire device, thereby forming the friction stir spot joining device capable of effecting the joining operation with ease. Meanwhile, since the LM guide 12 is provided in very close vicinity of the stirring motor 6 inside the power transmission box 3, the device is made compact, and further the amount of eccentricity between the LM motor 12 and the stirring motor 6 is reduced, thereby restraining the vibration caused by the intermittent torque to a small extent.

Figure 3:
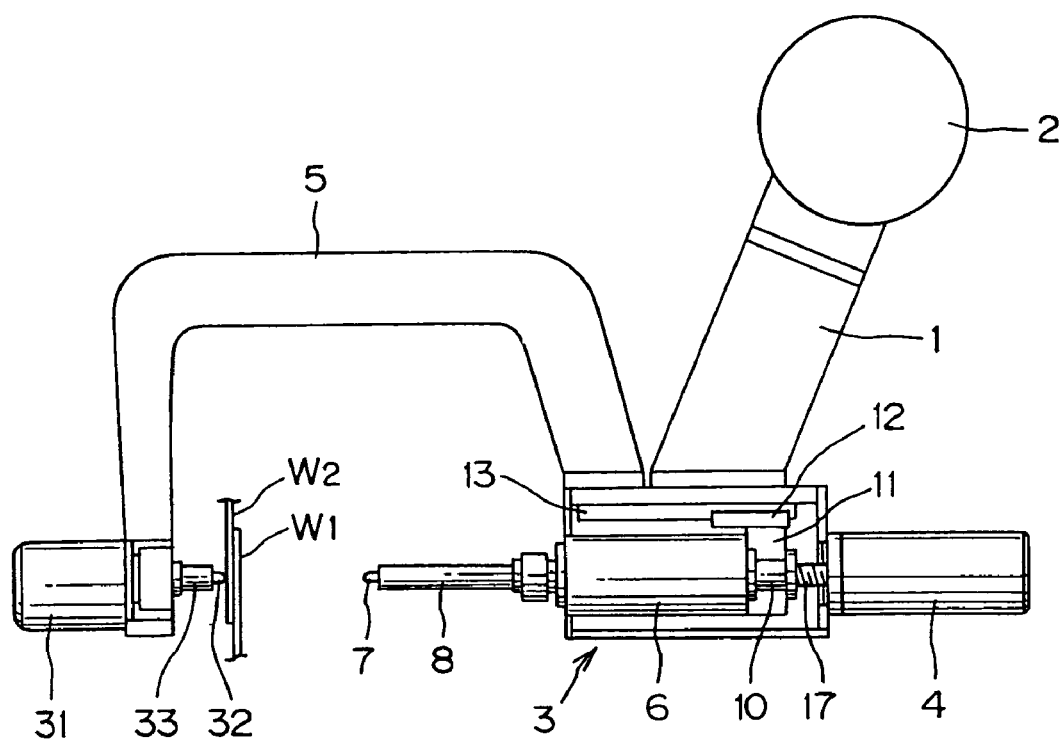
FIG. 3 is a view showing a schematic configuration of a friction stir spot joining device according to a second embodiment of the invention.

Second Embodiment (FIG. 3)

FIG. 3 is a view showing a schematic configuration of a friction stir spot joining device according to a second embodiment of the invention. In the second embodiment, a second stirring motor 31 is provided at the tip end of a fixed arm 5, and a second jointing tool 33 having a pin 32 at the tip end thereof is connected to the second stirring motor 31, which is different from the first embodiment. The other configurations of the second embodiment are substantially the same as those of the first embodiment, and hence the same members are depicted by the same reference numerals and the explanation thereof is omitted.

According to the friction stir spot joining device of the invention, it is possible to join the works W1, W2 to be joined together from the back side of the works W1, W2 to be joined by the pin 32 when the stirring motor 31 is driven in addition to the joining them from the front side thereof by the pin 7 when the stirring motor 6 is driven, thereby forming the friction stir spot joining device which is particularly effective in the case where the total thickness of the works W1, W2 to be joined is large.

Figure 4:
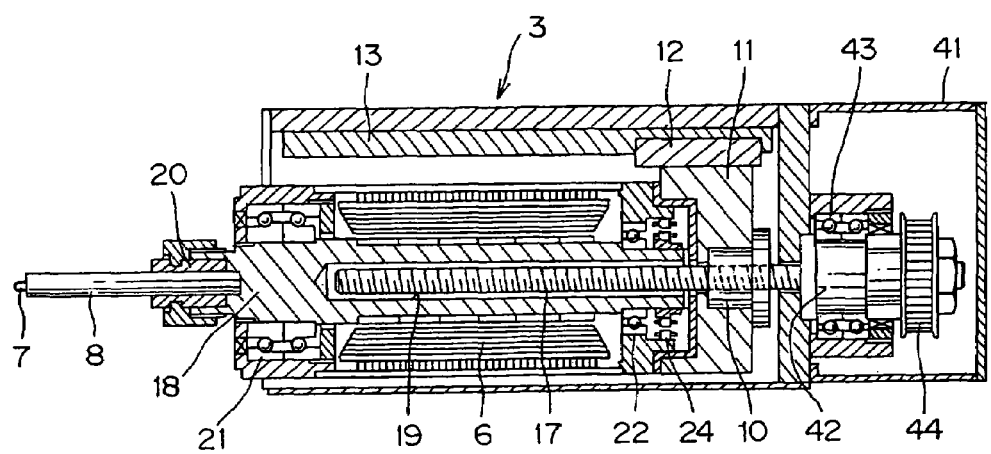
FIG. 4 is a schematic cross sectional view showing a transmittance mechanism from a stirring motor 6 and a pressing motor 4 of a pressing motor according to a third embodiment of the invention.
Figure 5:
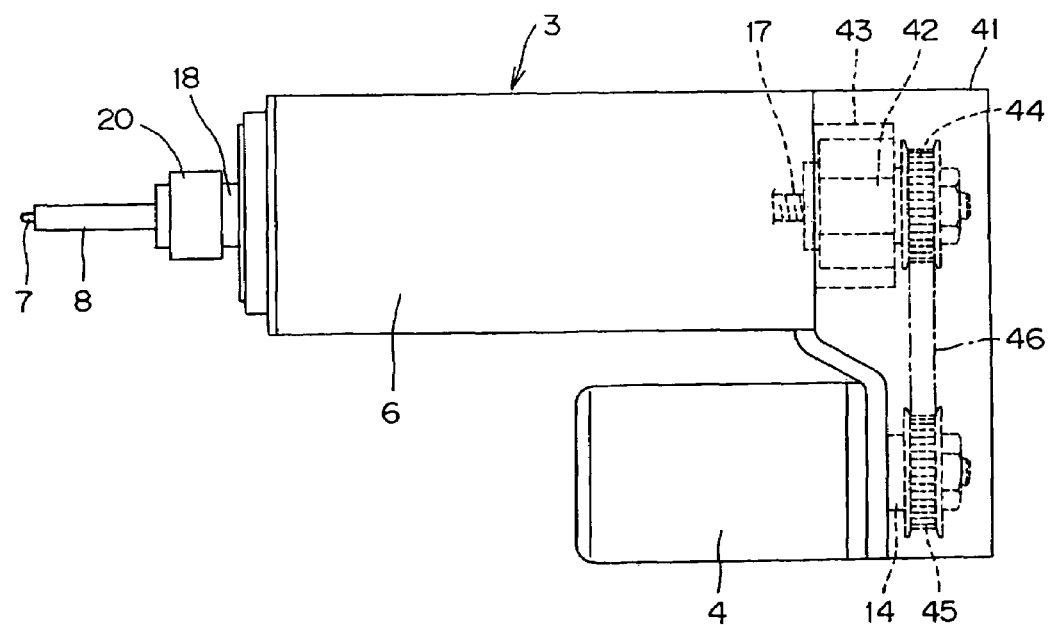
FIG. 5 is a schematic plan view of FIG. 4.

Third Embodiment (FIGS. 4 and 5)

FIG. 4 is a schematic cross sectional view showing a transmittance mechanism from a stirring motor 6 and a pressing motor 4 according to a third embodiment of the invention, and FIG. 5 is a schematic plan view of FIG. 4. In the third embodiment, the pressing motor 4 and the stirring motor 6 are disposed in parallel with each other, which is different from the first and second embodiments. The other configurations of the third embodiment are substantially the same as those of the first and second embodiments, and hence the same members are depicted by the same reference numerals and the explanation thereof is omitted.

In FIGS. 4 and 5, the stirring motor 6 provided in a power transmission box 3 and the pressing motor 4 are disposed in parallel with each other, and there is disposed a power transmission case 41 between a rear end side of the power transmission box 3 and a rotating shaft 14 of the pressing motor 4.

Further, there is provided a bearing 43 for supporting a ball screw 42 at the rear end side of the stirring motor 6 inside the power transmission case 41, and a pulley 44 is attached to the end of the axis of the ball screw 42.

Still further, a pulley 45 is attached to the rotating shaft 14 of the pressing motor 4 inside the power transmission case 41, and a toothed belt 46 is extended between the pulley 45 and the pulley 44.

Accordingly, the rotating force from the rotating shaft 14 generated by the driving of the pressing motor 4 rotates the ball screw 42 by way of the pulley 45, the toothed belt 46 and the pulley 44. When the ball screw 42 is rotated, the ball nut 10 threaded with a ball screw 17 is moved forward and backward, which allows the stirring motor 6 to which the ball nut 10 is fixed to move forward and backward, so that the stirring motor 6 changes the amount of movement of the jointing tool 8 having the pin 7 at the tip end from and toward the power transmission box 3 because it is connected to the jointing tool 8. When the stirring motor 6 is driven, it rotates the jointing tool 8 as set forth above, so that the pin 7 effects friction and stirring operation relative to the works W1, W2 to be joined.

Although not illustrated in the drawings, there is a case where a second stirring motor 31 is provided at the tip end of the arm 5 when the pressing motor 4 and the stirring motor 6 are connected in parallel with each other like the case where the pressing motor 4 and the stirring motor 6 are connected in series with each other.

Figure 6:
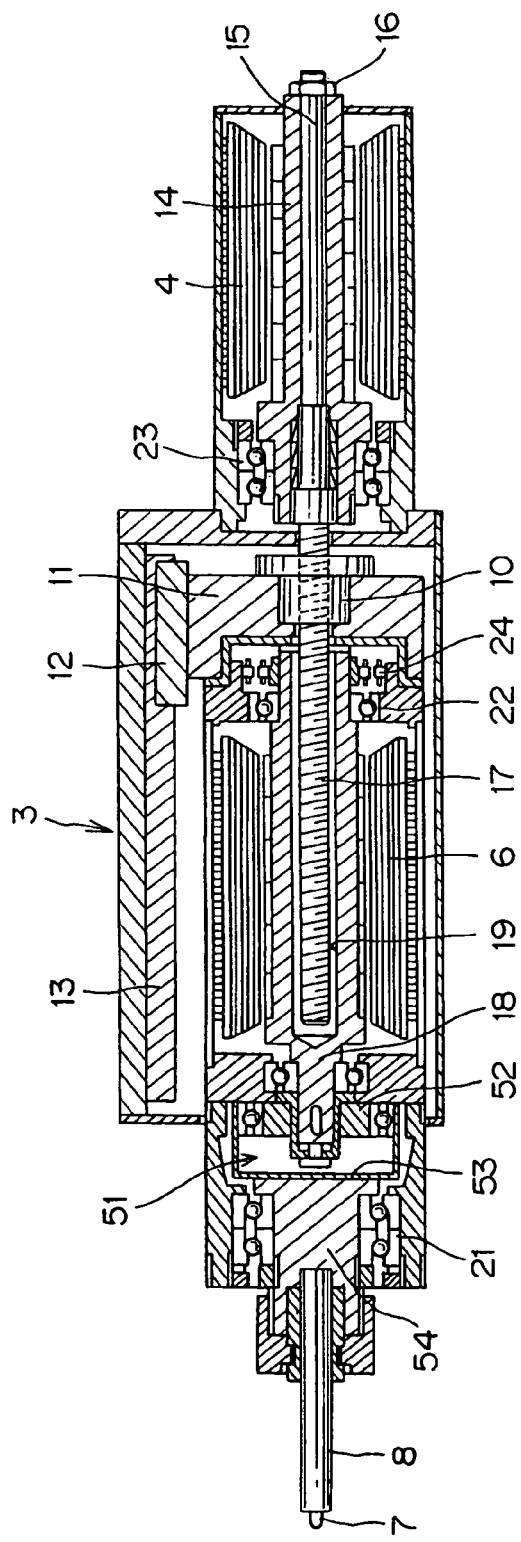
FIG. 6 is a schematic cross sectional view showing the relation of connection between a jointing tool, a stirring motor and a pressing motor according to a fourth embodiment of the invention.

Fourth Embodiment (FIG. 6)

FIG. 6 is a schematic cross sectional view showing the relation of connection between a jointing tool, a stirring motor and a pressing motor according to a fourth embodiment of the invention. In the fourth embodiment, a reduction gear 51 is intervened between an output shaft 18 of a stirring motor 6 and a jointing tool 8, which is different from the first to third embodiments. The other configurations of the fourth embodiment are substantially the same as those of the first to third embodiments, and hence the same members are depicted by the same reference numerals and the explanation thereof is omitted.

An input portion 52 of the reduction gear 51 is connected to the tip end side of the output shaft 18 of the stirring motor 6 while an output portion 53 thereof is connected to the jointing tool 8 having a pin 7 at the tip end by way of an angular bearing 54.

Since the stirring motor 6 used in the friction stir spot joining operation does not use parts such as a ball screw which are liable to generate oscillation when the rpm is increased, there is no limit in respect of the rpm by machine parts. Further, since the stirring motor 6 is mounted on the tip end portion of the friction stir spot joining device, it becomes the key issues to prevent the stirring motor 6 from interfering with the portion surrounded by the works to be joined and the jig. To that end, it is necessary to reduce an outer diameter of the motor, which is liable to reduce an output torque of the motor. Accordingly, if the rpm of the motor is increased up to about five to ten times as large as the rpm needed to the stirring operation by the pin 7 (1000 rpm~2000 rpm) while outer diameter of the stirring motor 6 remains small, and the rpm of the output shaft 18 of the stirring motor 6 is increased by the reduction gear 51 (e.g. harmonic drive) up the optimum torque needed for the friction stir spot joining operation, and decreased to the necessary rpm, even if the stirring motor 6 is mounted on the tip end portion of the friction stir spot joining device, it becomes the friction stir spot joining device which reduces the interference of the stirring motor 6 with a narrow portion surrounded by the works to be joined and a jig.

Although not illustrated in the drawings, there is a case where the reduction gear 51 is intervened between the output shaft 18 of the stirring motor 6 and the jointing tool 8 when the pressing motor 4 and the stirring motor 6 are connected in parallel with each other like the case where the pressing motor 4 and the stirring motor 6 are connected in series with each other.

The disclosure of Japanese Patent Application No. 2004-016909 including specification, claims, and drawings, is incorporated herein by reference.

What is claimed is:

1. A friction stir spot joining device for softening and stirring works to be joined due to friction heat generated by rotation of a pin so as to join the works to be joined together and provided with a pressing motor and a stirring motor fixed to one end side of an arm, a jointing tool having the pin at a tip end thereof and connected to an output shaft side of the stirring motor at a rear end thereof, said stirring motor and said jointing tool being disposed on the same axis line, said friction stir spot joining device further including:
   a ball nut fixed to the rear end side of the stirring motor;
   wherein the output shaft of the stirring motor has a hole in which a ball screw is housed from a rear portion of the hole so as to be positioned in the hole; and
   wherein a rotating force of the pressing motor is transmitted to the ball screw and the stirring motor is moved forward and backward by the ball nut threaded with the ball screw.

2. A friction stir spot joining device according to claim 1, wherein the pressing motor and the stirring motor are connected in series with each other.

3. A friction stir spot joining device according to claim 2, further including a second stirring motor at the tip end of the arm.

4. A friction stir spot joining device according to claim 1, wherein the pressing motor and the stirring motor are connected in parallel with each other.

5. A friction stir spot joining device according to claim 4, further including a second stirring motor at the tip end of the arm.

6. A friction stir spot joining device according to claim 1, further including a reduction gear intervened between the output shaft of the stirring motor and the jointing tool.

7. A friction stir spot joining device according to claim 2, further including a reduction gear intervened between the output shaft of the stirring motor and the jointing tool.

8. A friction stir spot joining device according to claim 4, further including a reduction gear intervened between the output shaft of the stirring motor and the jointing tool.

* * * * *